US008844463B2

(12) United States Patent
Bamford

(10) Patent No.: US 8,844,463 B2
(45) Date of Patent: Sep. 30, 2014

(54) PIPE CONDITIONING TOOL

(75) Inventor: Brad Bamford, Toronto (CA)

(73) Assignee: Automatic Coating Limited, Toronto (CA)

(*) Notice: Subject to any disclaimer, the term of this patent is extended or adjusted under 35 U.S.C. 154(b) by 0 days.

(21) Appl. No.: 13/351,200

(22) Filed: Jan. 16, 2012

(65) Prior Publication Data
US 2012/0272897 A1 Nov. 1, 2012

Related U.S. Application Data

(60) Provisional application No. 61/433,023, filed on Jan. 14, 2011.

(51) Int. Cl.
B05B 13/02 (2006.01)
B05C 5/00 (2006.01)
B05B 3/02 (2006.01)
B05C 9/02 (2006.01)
B24B 5/42 (2006.01)
B05B 13/04 (2006.01)
B05C 5/02 (2006.01)
F16L 58/10 (2006.01)
B24C 3/06 (2006.01)
B08B 9/023 (2006.01)
B08B 9/04 (2006.01)
B08B 3/02 (2006.01)

(52) U.S. Cl.
CPC ......... *F16L 58/1072* (2013.01); *B05B 13/0214* (2013.01); *B24B 5/423* (2013.01); *Y10S 118/11* (2013.01); *B05B 13/0436* (2013.01); *B08B 9/023* (2013.01); *B24C 3/06* (2013.01); *B05C 5/0241* (2013.01); *B05B 13/0421* (2013.01); *B08B 9/04* (2013.01); *B08B 3/024* (2013.01)
USPC ........... 118/323; 118/305; 118/307; 118/313; 118/326; 118/500; 118/DIG. 11; 15/104.04; 15/320; 15/340.1; 134/180; 134/199; 427/427.4; 427/427.3

(58) Field of Classification Search
USPC ............ 118/307, 323, DIG. 11, 312, 313–16, 118/300; 134/104.2, 172, 122 R, 180, 199; 451/83, 89, 92, 38; 15/104.4; 104/89
See application file for complete search history.

(56) References Cited

U.S. PATENT DOCUMENTS 2,359,751 A 10/1944 Cummings et al.
4,552,594 A * 11/1985 van Voskuilen et al. ........ 134/34
4,716,271 A * 12/1987 Hulsizer et al. .......... 219/125.11
5,199,226 A * 4/1993 Rose ............................ 118/323

(Continued)

OTHER PUBLICATIONS

Gojkovic E.; Search Report from corresponding PCT Application No. PCT/CA2012/050027; search completed May 7, 2012.

*Primary Examiner* — Dah-Wei D Yuan
*Assistant Examiner* — Binu Thomas
(74) *Attorney, Agent, or Firm* — John R. S. Orange; Blake, Cassels & Graydon LLP

(57) ABSTRACT

A pipe conditioning tool comprising a drive unit to move the tool along a pipe and a work head rotatable about an axis of the pipe to condition a surface of the pipe, the drive unit includes a frame extending to opposite sides of the pipe, the frame having legs extending radially beyond the work head to provide support for the tool upon removal from said pipe.

19 Claims, 25 Drawing Sheets

(56) References Cited

U.S. PATENT DOCUMENTS

| | | | | |
|---|---|---|---|---|
| 5,207,833 A * | 5/1993 | Hart | | 118/307 |
| 5,238,331 A * | 8/1993 | Chapman | | 118/307 |
| 5,743,969 A | 4/1998 | Lawler | | |
| 6,626,376 B1 * | 9/2003 | Rose | | 118/DIG. 11 |
| 6,832,406 B1 | 12/2004 | Boos et al. | | |
| 6,881,266 B1 * | 4/2005 | Daykin et al. | | 118/305 |
| 7,059,945 B2 * | 6/2006 | Skinner | | 118/307 |
| 7,140,065 B2 | 11/2006 | Boos et al. | | |
| 2008/0017568 A1 | 1/2008 | Robert et al. | | |

* cited by examiner

PIPE CONDITIONING TOOL

FIELD OF THE INVENTION

This invention relates, generally, to pipeline surface preparation systems. More particularly, it relates to machines that travel along the length of a pipeline to perform conditioning operations such as coating removal, surface cleaning and recoating.

DESCRIPTION OF THE PRIOR ART

Pipelines used to carry materials such as oil, gas and water are formed from sections of pipes welded end to end. During manufacture, the sections of pipe are usually coated on their exterior surface to inhibit corrosion of the pipe material. The ends of the pipe are not coated prior to welding so that after welding, it is necessary to coat the girth weld to provide an integrity of coating. As part of the maintenance protocol, it is necessary, periodically, to remove the coating from the entire pipe, prepare the surface for recoating, and apply a coating to the surface.

Pipelines are typically buried so removal of the coating requires the pipeline to be excavated and lifted to allow access to the pipe. Manual removal of the coating is laborious and potentially dangerous due to materials used and the potential to damage the surface of the pipe. Machines have been proposed that are intended to be supported on and move along the pipe to remove the coating. However, earlier devices are so heavy that a crane is needed to lower them into position atop a pipe. The weight of such devices causes the pipe to sag and thus limits the length of pipeline that can be excavated at any onetime. When a crane drops a heavy pipeline surface preparation systems onto a pipeline, there is a risk of damage and ultimately catastrophic explosions may occur.

U.S. Pat. No. 5,238,331 to Chapman describes a pipeline surface preparation system that is sufficiently light-in-weight to enable a team of two workers to place it into position around a pipeline in the absence of lifting machinery. A frame surrounds the pipeline and supports wheels that engage the surface of the pipeline and enable the pipeline surface preparation system to travel along the extent thereof. The Chapman apparatus employs water jets to strip coating from a pipeline. Water nozzles are circumferentially spaced about the perimeter of the pipeline and limit switches are employed to cause the frame that carries the nozzles to reciprocate along a circumferential path of travel so that hoses connected to the apparatus are not wrapped around the pipeline as the apparatus advances along the length thereof.

U.S. Pat. No. 6,832,406 to Boos describes a machine that is used to remove ah old coating from a pipe. The pipe is enclosed within a shroud. Debris removed from the pipe surface is removed from the shroud by a vacuum line so it may be filtered and disposed of effectively. The machine shown in U.S. Pat. No. 6,832,406 has been used commercially with success. The arrangement of water nozzles and controls avoids the potential damage to the pipe surface if the machine encounters unforeseen obstacles and the overall design allows the machine to be positioned on the pipeline by workers and operate within the confines of the excavation.

Similar machines may be used to blast the pipe surface after the coating is removed and then to apply a new coating. As such a train of machines are located on the exposed length of pipe. Because it is only practical to expose a limited length of pipe at a time, it is preferable that the machines are easily removed and can be set aside while additional excavation is undertaken.

OBJECT OF THE INVENTION

It is therefore an object of the present invention to obviate or mitigate the above disadvantages.

SUMMARY OF THE INVENTION

According to one aspect of the present invention there is provided a pipe conditioning tool comprising a support frame, a guide member on said support frame to permit movement of said frame along a surface of a pipe, a work head carried by said frame and operable to perform work on said surface, said support frame having a pair of legs at spaced locations to pass to opposite sides of said pipe, whereby said legs provide a stable support for said tool when said tool is removed from said pipe.

Preferably, the tool includes a drive on the frame to engage the surface and move the frame along the pipe.

Preferably also, the tool includes a pair of arms pivotally secured to the frame and each carrying a guide member. The arms are swingable from an open position in which the arms are spaced apart to permit a pipe to pass between and an engaged position in which said guide members engage the surface and inhibit removal of the frame from the pipe.

As a further preference, the work head oscillates relative to the frame about said pipe.

Embodiments of the invention will now be described by way of example only with reference to the accompanying drawings in which FIG. 1 is a side perspective view of one embodiment of a pipe conditioning tool;

Figure 1:
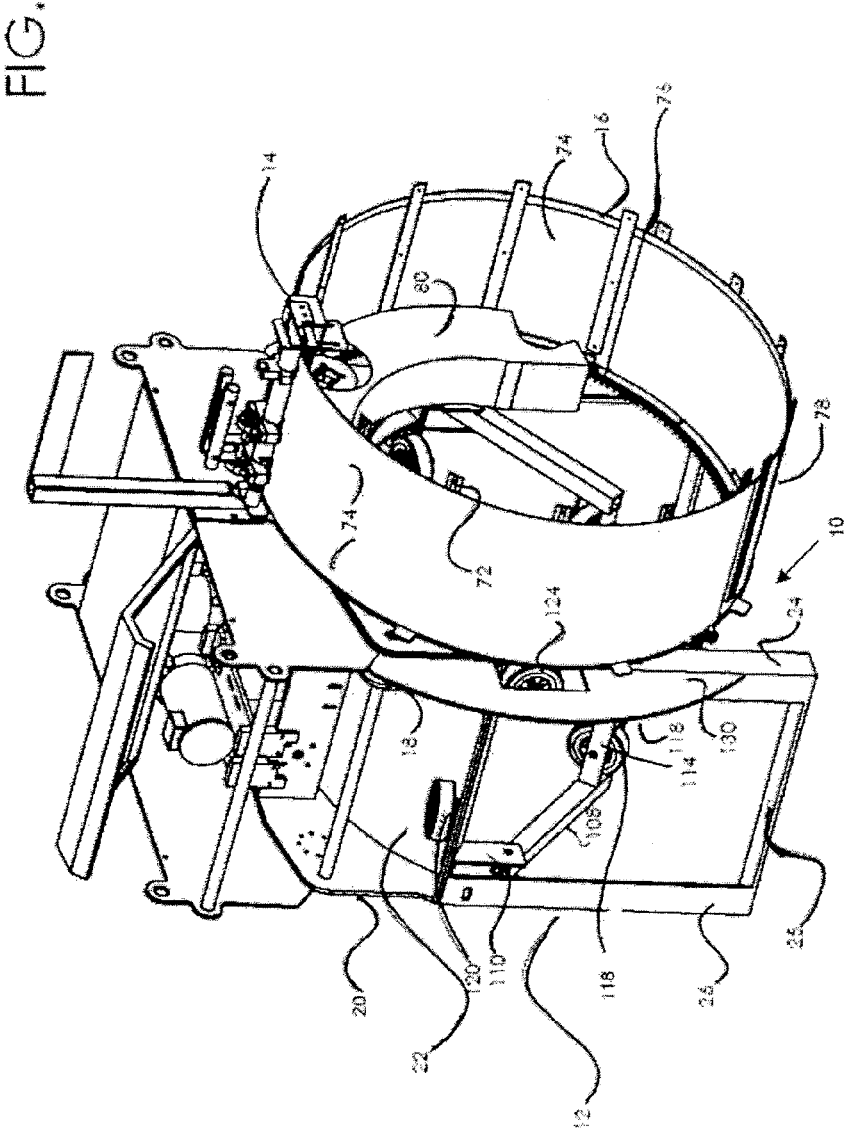
Figure 2:
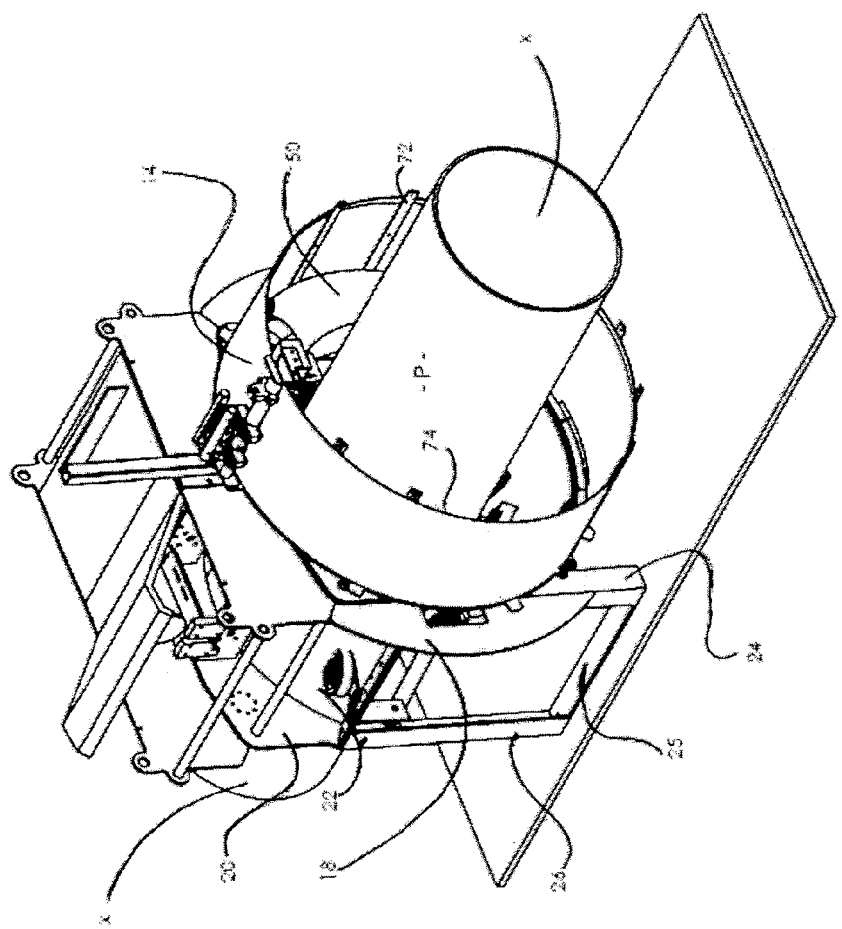
FIG. 2 is a front perspective view of the tool of FIG. 1 located on a pipe.
Figure 3:
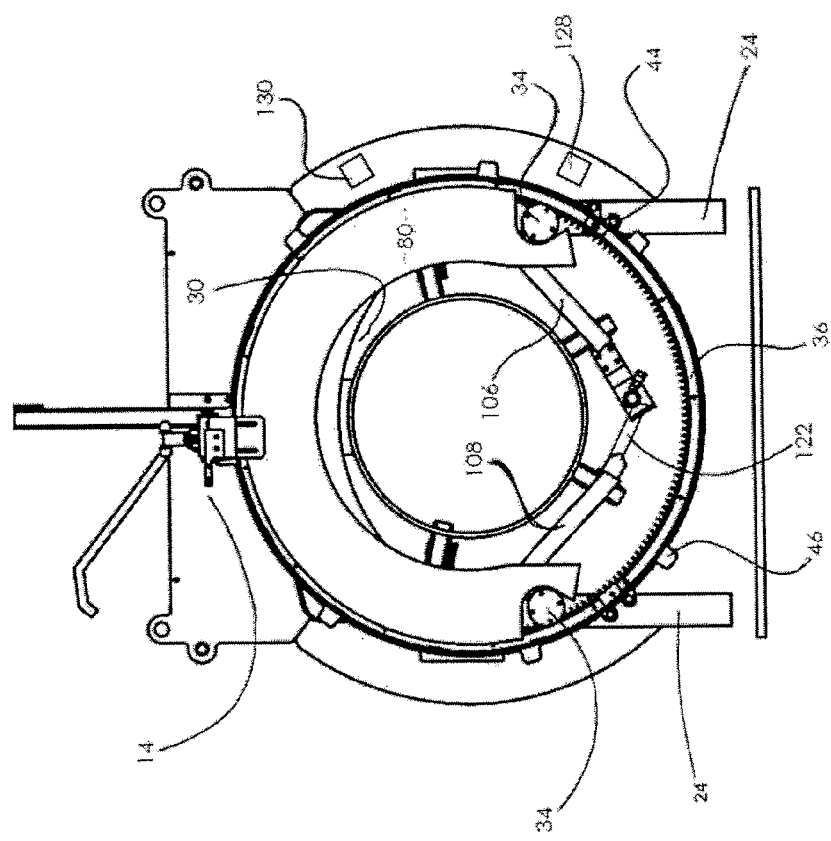
FIG. 3 is a front elevation of the tool of FIG. 1.

Initially, an embodiment will be described in the context of a machine to condition and/or coat a pipe after the previous coating has been removed, but, as will be appreciated from the subsequent embodiments, certain features may be utilized for machines to remove coating from a pipe and to apply a coating to a girth weld.

Referring to the drawings, a pipe conditioning tool 10 used to prepare a surface of a pipe has a support frame 12 that carries a work head 14 and a shroud 16. As can best be seen from FIG. 4, the tool 10 is arranged to straddle a pipe P so as to be moveable along the longitudinal axis x-x of the pipe P and perform work on the exterior surface of the pipe P to condition the surface. The pipe P may be an exposed length of an existing pipe, or may be a new pipe being prepared for installation. Such conditioning can include removal of existing coatings, surface preparation and recoating of the exterior surface, although in the embodiment shown in FIGS. 1-12, the machine is used for applying a coating to a pipe.

The support frame 12 includes a pair of yokes 18, 20 spaced apart along the longitudinal axis of the pipe P and connected by a saddle 22. Each of the yokes 18, 20 has a pair of laterally spaced legs 24, 26 that are interconnected by a plate 28 that forms the bight of the yoke 16, 18. The edge 30 of the plate 28 facing the pipe is arcuate so as to generally conform to the outer surface of the pipe P. Lower ends of the legs 24, 26 on each side of the pipe P extend radially beyond the work head 14 and shroud 16 and are connected by a longitudinal frame member 25 to provide a foot for an additional bearing surface for the legs 24, 26.

The plate 28, adjacent work head 14, carries a drive gear 32 and a set of guide rollers 34 that are arranged around the circumference of a circle to support a drive ring 36. The drive ring 36 has an annular outer band 38 with a inwardly directed flange 40. Teeth 42 are formed on the radially inner edge of the flange 40. The drive ring 36 is formed from upper and lower part circular sectors 36a 36b which are pivotally connected at a hinge point 44. A latch 46 secures the upper and lower sectors 36a, 36b, to one another at laterally spaced locations to form a continuous ring 36.

The drive gear 32 and guide rollers 34 each include a hub 48 with a pair of rims 50 on opposite sides of the hub 48. The hub 48 and rims 50 support the flange 40 of the ring 36 which is received between the rims 50 and thus guide it for rotation about the axis of the pipe in a plane orthogonal to the axis of the pipe.

The hub 48 of the driven gear 32 is formed as a sprocket with external teeth 52 that are complementary to and engage the teeth 42 of the ring 36. Rotation of the driven gear 32 thus causes rotation of the ring 36 with the guide rollers 34 maintaining the ring in the required location.

Figure 4:
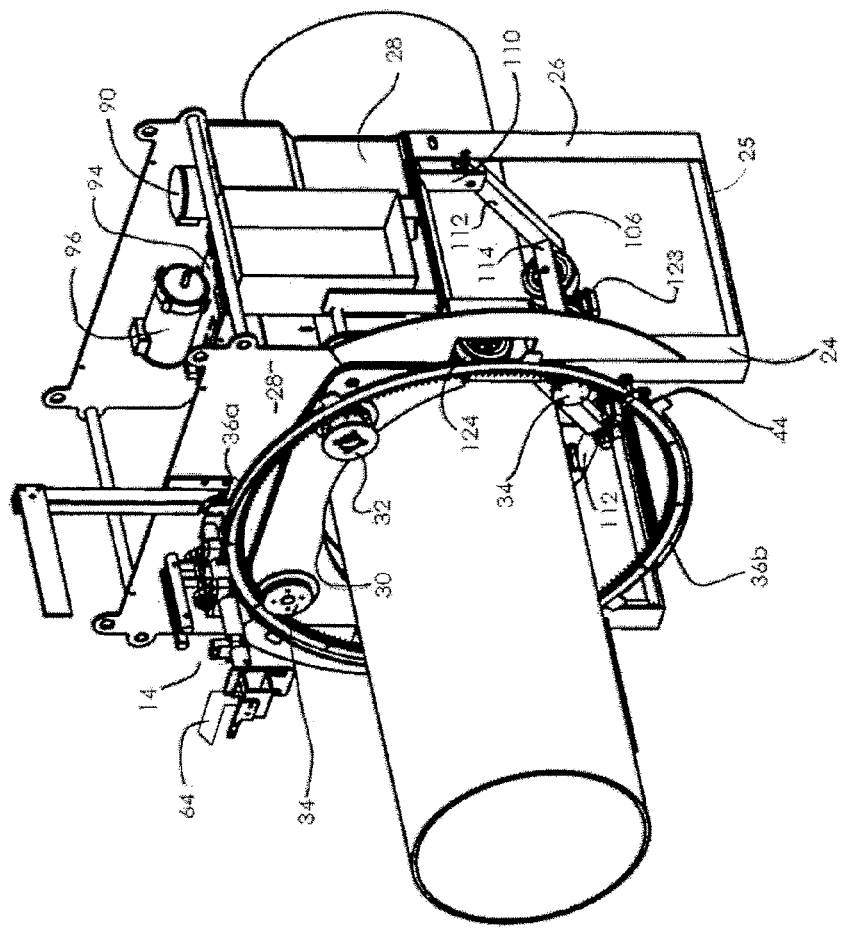
FIG. 4 is a perspective view from the opposite side of FIG. 1 with portions of the tool removed for clarity.
Figure 5:
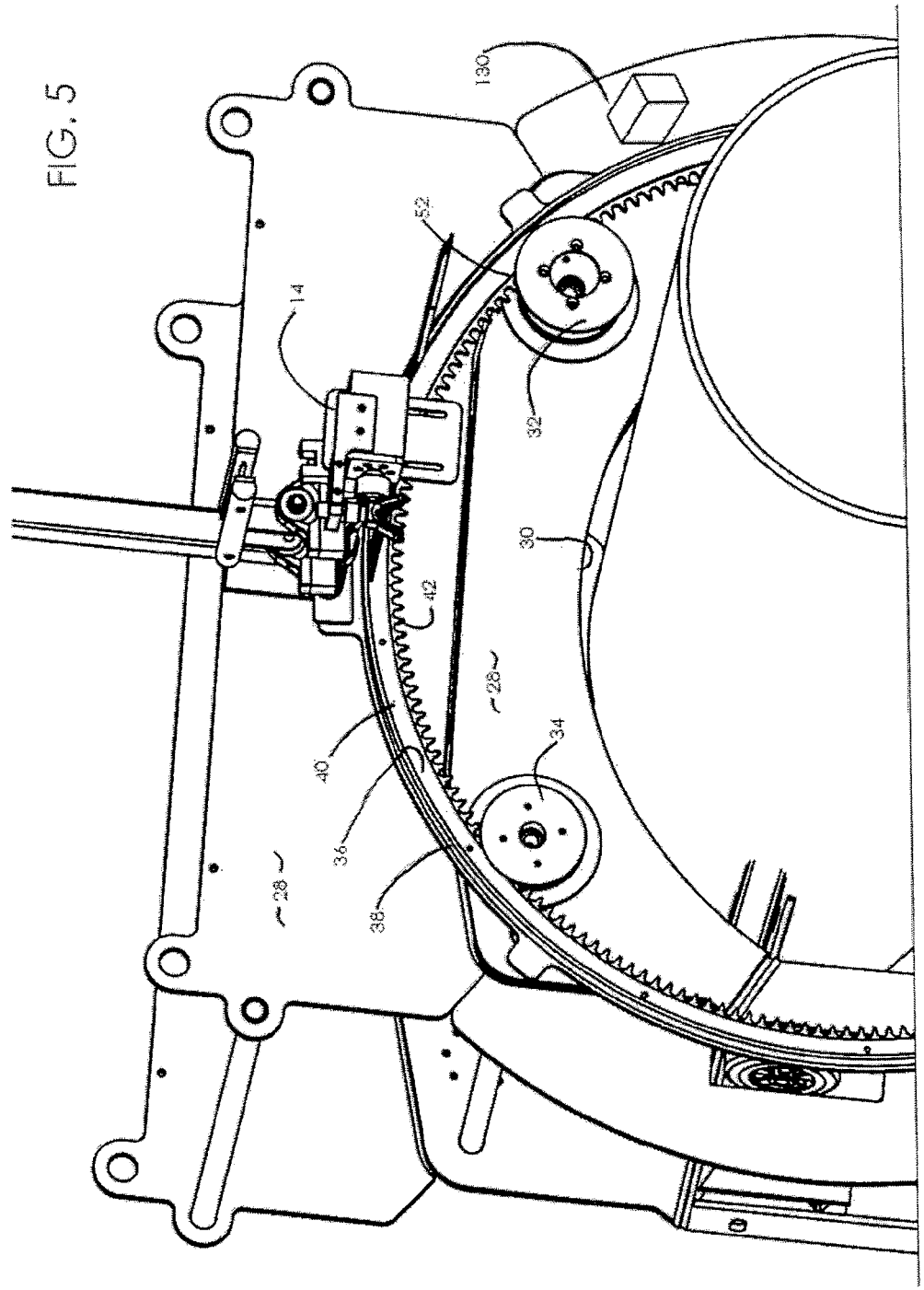
FIG. 5 is an enlarged view of the machine of FIG. 4 from an opposite side.
Figure 6:
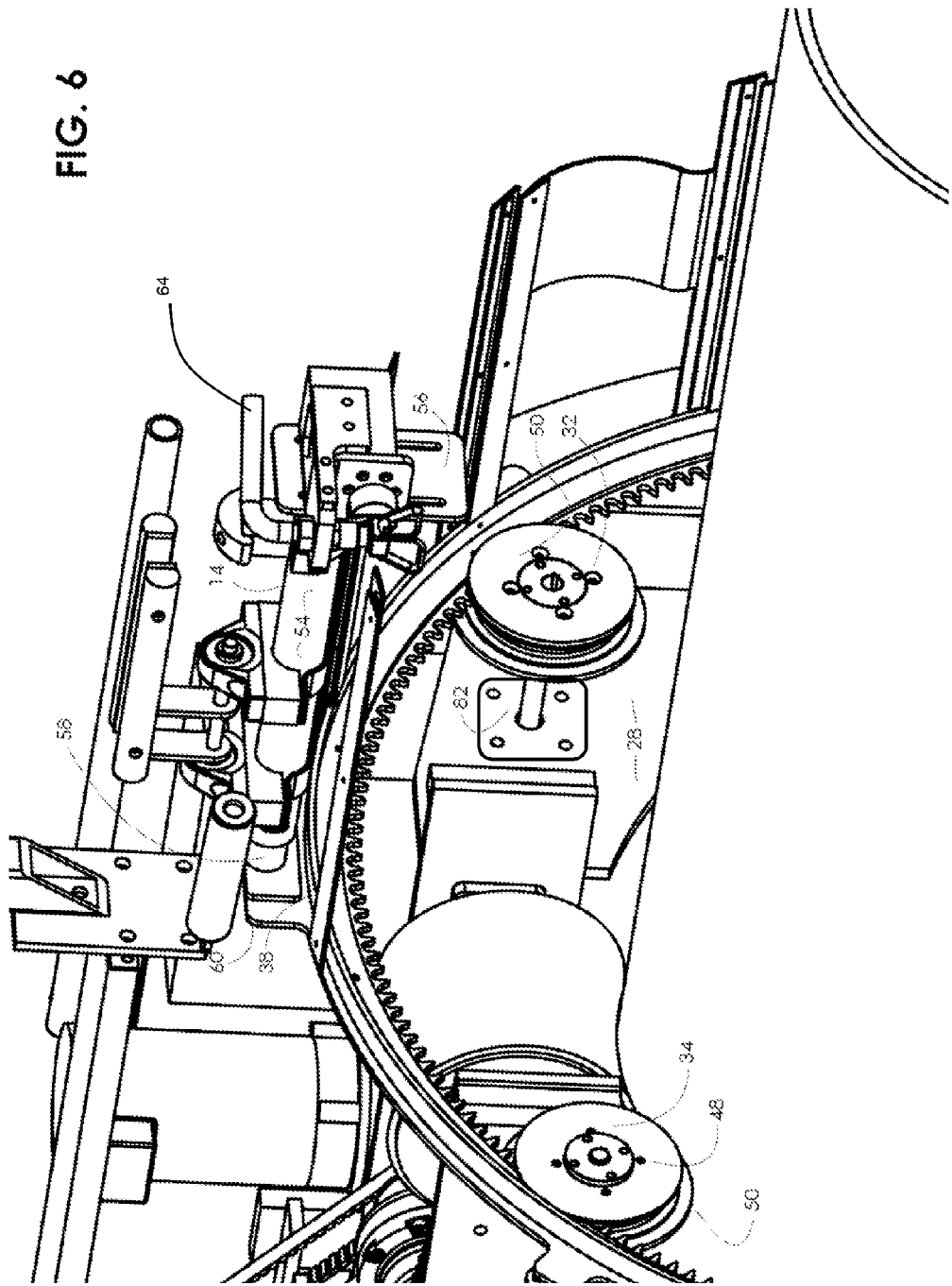
FIG. 6 is a view of a part of the tool shown in FIG. 5 with components separated for clarity.
Figure 7:
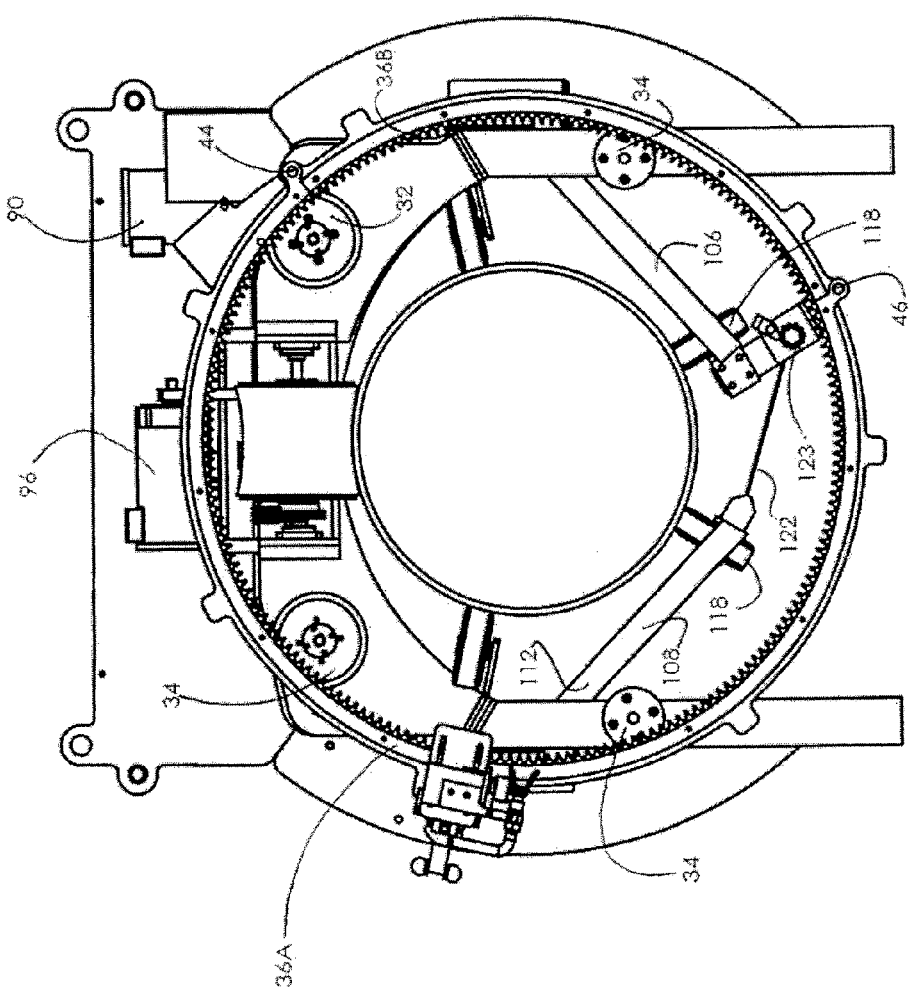
FIG. 7 is an end view of the machine of FIG. 4 with components moved to one extreme position.

The ring 36 carries one or more work heads 14 most clearly shown in FIGS. 4 to 6. In the embodiment shown, the work head 14 is a spray head intended to deposit a coating on to the outer surface of the pipe P. It could however be a sand blasting head, as shown in FIG. 13, used to remove corrosion or other contaminants from the surface prior to coating, or could be a water jet intended to break and remove a fibrous coating applied to the pipe P.

In the embodiment of FIGS. 1-12, a single work head 14 is provided and, as described more fully below, provision is made for rotating the work head 14 through more than 360°.

Figure 13:
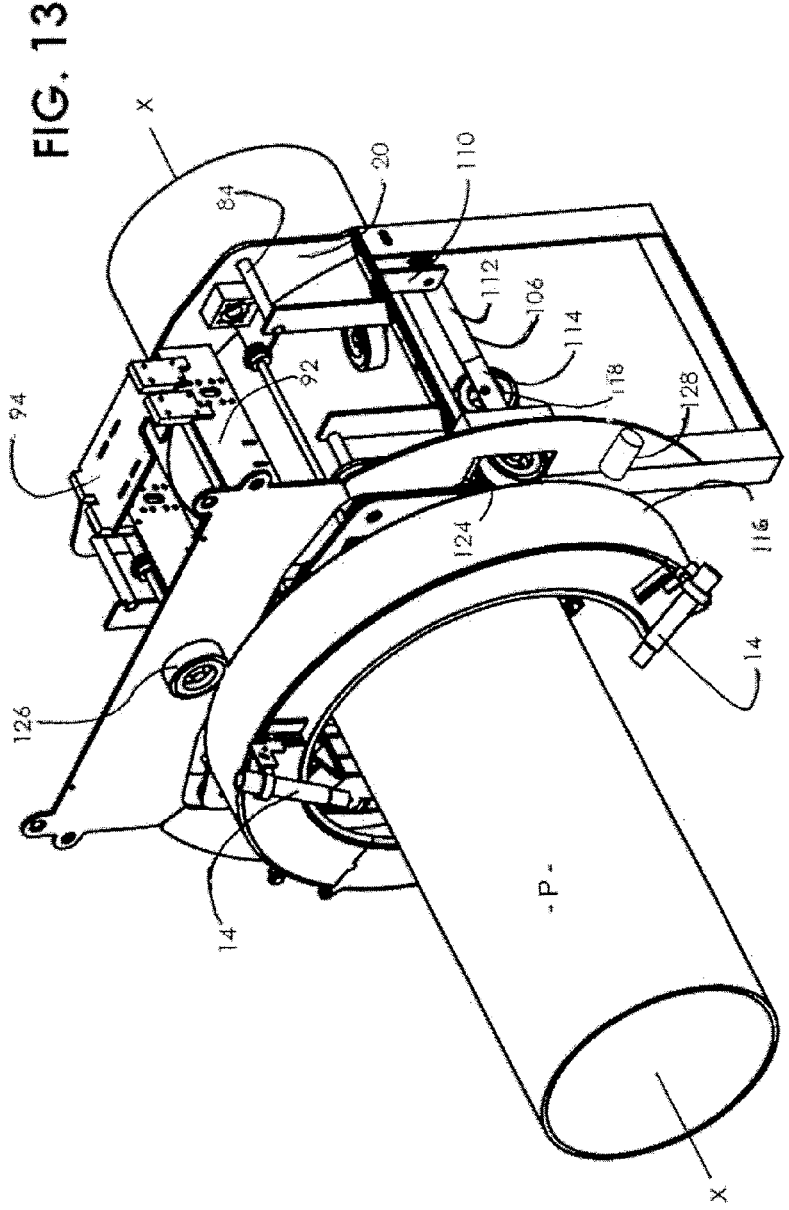
FIG. 13 is a perspective view of an alternative embodiment of pipe conditioning tool.

In the embodiment of FIG. 13, three nozzles 14 are disposed at 120° intervals around the ring 36, allowing the work heads to be reversed after a smaller segment.

The work head 14 includes an axial shaft 54 that carries a spray nozzle 56 at one end. The nozzle 56 is of known construction and will not be described in greater detail at this time. As shown in FIG. 6, the opposite end of shaft 54 to the nozzle 56 is secured by a splined coupling 58 to a radially projecting mounting tab 60 formed on the outer edge of the band 38. The shaft 54 is secured to the spline 58 by a detent (not shown) to hold the shaft in a fixed orientation relative to the ring 36.

The head 14 is connected to a material supply through a hose 64. The supply may be a source of high-pressure water, coating material or abrasive grit depending upon the particular conditioning operation to be performed.

Referring again to FIG. 1, the shroud assembly 16 is carried on the ring 36 and includes axial brackets 72 secured to the flange 40 of the ring 36. Arcuate panels 74 are connected to the brackets to extend about the pipe P. The panels 74 are assembled in two segments with a hinge 76 and latch 78 located at similar locations as the hinge 44 and latch 46 connecting the sectors 36a, 36b of ring gear 36. In this way, the shroud and ring may be opened to allow the tool to be placed over the pipe P.

A horseshoe shaped fixed cover 80 is secured within the shroud 16 so as to cover the upper portion of the ring 36. The work head 14 projects axially beyond the shroud 16, although the shroud may be adapted to allow the work head 14 to be located within the shroud and contain the conditioning material if desired.

Figure 8:
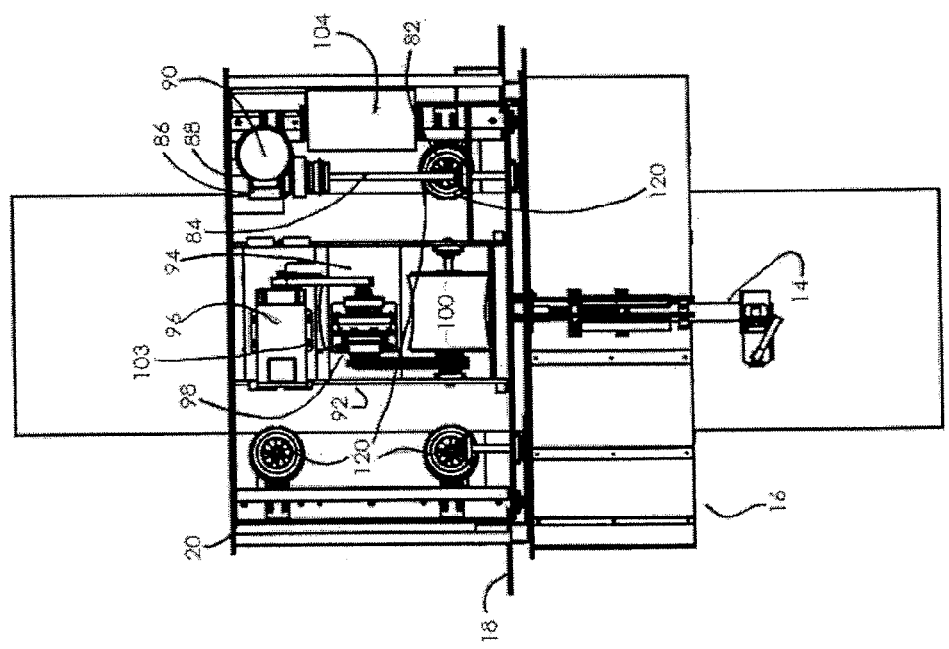
FIG. 8 is a plan view of the tool of FIG. 1.

The driven roller 32 is mounted on a bearing 82 on the yoke 18 and connected to a drive shaft 84 FIG. 8. The drive shaft 84 extends through the yoke 18 toward the yoke 20 and is coupled to a transmission 86 that is mounted on a shelf 88 secured to the yoke 20. An electric motor 90 is mounted on the transmission 86.

A pair of stretcher plates 92 extend between the yokes 18, 20 and support a platform 94. A drive motor 96 is mounted on the platform 94 and acts through a transmission 98 to control rotation of a drive wheel 100. The drive wheel 100 is rotatably mounted on bearings 102 between the stretcher plates 92 for rotation about an axis transverse to the longitudinal axis of the pipe P. The drive wheel 100 has a concave outer surface to conform generally to the outer surface of the pipe. The outer surface of the drive wheel 100 is typically a rubber or similar compound to provide grip to the surface sufficient to be able to move the tool 10 along the axis of the pipe when required.

A similar roller 103 is provided to support the rear of the drive unit and typically is not driven, although the transmission may drive it as well if preferred.

Control of the drive motor 96 and motor 90 is provided through a logic control panel 104 that is mounted between the yokes 18, 20 on the saddle 22. The control panel 104 incorporates logic control devices of a conventional nature to control the operation of the motors 90, 96 in a manner to be described below.

A pair of swing frames 106, 108 are pivotally secured to lugs 110. The swing frames 106, 108 each include a pair of arms 112 connected to a cross member 114. One end of the arms 112 is pivotally connected to the lugs 110 for movement about an axis generally parallel to the longitudinal axis of the pipe.

A pair of guide wheels 116, 118 are connected to respective ones of the cross members 114 at longitudinally spaced locations. The guide wheels 116, 118 are oriented to roll along the surface of the pipe as the tool is moved along the longitudinal axis of the pipe.

Fixed guide wheels 120 are also secured to the saddle 22 adjacent to the yoke 20 to bear against the surface of the pipe P. The fixed guide wheels 120 support the trailing edge of the tool 10 whilst maintaining sufficient load on the drive wheels 100 to allow the wheel 100 to grip the surface of the pipe P. A flexible strap 122 extends between the swing frames 106, 108 and is used to hold the swing frames in a position in which the guide wheels 116, 118 engage with the underside of the pipe P. The strap is adjusted by a ratchet and pawl device 123 so it may be tensioned to hold the tool in place, and released to allow removal of the tool.

The forward yoke 18 also carries a set of fixed guide wheels indicated at 124 and 126. The guide wheels 124 engage the rear face of the ring 36 to resist longitudinal forces, and the wheel 126 is located on the radially outer face of the ring 136 to locate the ring radially.

Limit switches 128 130 are secured to the yoke 18 and the ring 36 so as to be responsive to movement of the ring to a predetermined position relative to the frame 12. Limit switches 128, 130 may be mechanical, optical or, preferably proximity devices that provide control signals to the control panel 104. In some embodiments, as described below, only a single limit switch is required.

In operation, the tool is initially positioned to one side of the pipe P with the legs 24, 26 supporting the work head 14 in a stable, elevated position above the immediate surrounding. The tool 10 may then be lifted above the pipe P and the strap 122 released to that the swing frames 106 108 hang generally vertically along side the legs 24 26. In this position, the lower segment of the ring 36 and shroud 16 are unlatched and pivoted about the hinges 44 76 to provide an inverted U-shaped configuration for the tool 10.

With the tool 10 elevated, it may be positioned over the pipe P and lowered until the drive wheels 100 and the fixed guide wheels 120 engage the upper surface of the pipe P. In this position, the tool is once more stably supported on the pipe in the desired axial position. The tool 10 may then be secured by swinging the swing frames 106, 108 about the lugs 110 until the guide wheels 116, 118 engage the pipe surface. The strap 122 is secured and tensioned to hold the wheels firmly against the surface of the pipe. In this position, the drive wheel 100, idler 103 and fixed guide wheels 120 maintain the yokes 16, 18 spaced from the surface of the pipe but inhibit pitching motion of the frame 12. Vertical displacement of the frame 12 in inhibited by the swing frames 106 108.

The lower segment of the ring 36 and shroud 16 may then be closed around the under side of the pipe and latched through latches 46, 78 respectively. The hose 64 is connected to a supply of conditioning material and a control panel 104 connected to a supply of electricity.

Initially, the motor 92 is operated to rotate the shaft 84 and cause the ring 36 to rotate about the axis of the pipe P. The guide rollers 34 maintain the circular disposition of the ring 36 and as the ring 36 rotates, the work head 14 traverses a sector of the outer surface of the pipe P. After predetermined rotation, the limit switch 128 indicates the first extreme position of the ring relative to the frame 12. A control signal from the limit switch is sent to the panel 104 which causes the motor 90 to reverse and rotate the shaft 84 in the opposite direction. The ring 36 is similarly rotated in the opposite direction until, after a predetermined rotation typically in the order of 180 degrees with a single work head, the rotation is again reversed by the limit switch 130. The work head 14 oscillates about the longitudinal axis of the pipe P so that the entire surface of the pipe is traversed.

The control panel 104 also controls the rotational speed of the drive motor 96 which acts through the transmission 98 on the drive wheel. The drive wheel 100 advances the frame 12 along the pipe P causing a new area of the pipe surface to be traversed at each oscillation of the work head 14. The speed of advance will of course be determined by the work to be performed and the advance may be interrupted at any time should further surface conditioning be required on the pipe.

During oscillation of the work head 14, the hoses 64 are supported by the shroud so that they may be supplied with the conditioning material from a source along side the pipe.

Once the surface has been treated, the tool 10 can be removed by releasing the strap 122 and opening the shroud 16 and ring 36. The tool 10 may then be lifted, the shroud closed and the tool 10 deposited on the ground in a stable position supported by the legs 24, 26.

As noted above, the number of work heads 14 that are utilized will depend upon the particular circumstances and material being used.

When a single coating head 14 is utilized, the operation of the proximity switches is arranged such that a full circumference of the pipe may be traversed with the single head rather than with multiple heads as explained in greater detail below with reference to FIGS. 9 through 12. This requires the movement of the hose 64 to be controlled to inhibit engagement with the shroud 16.

Figure 9:
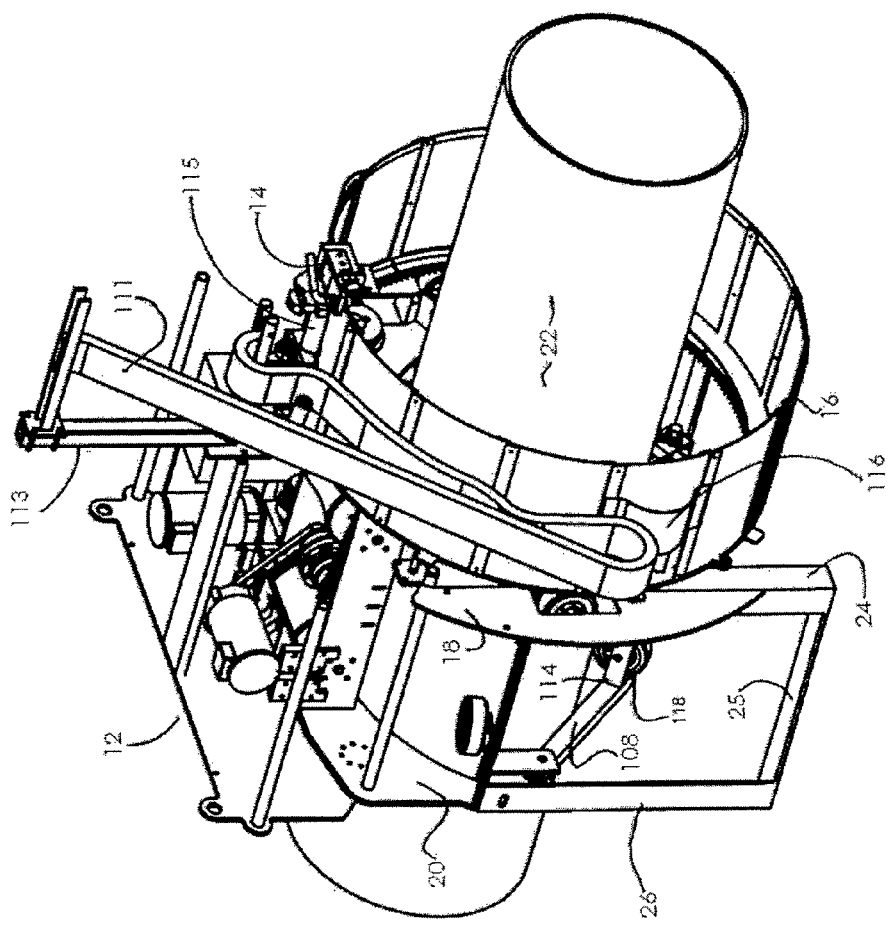
FIG. 9 is a perspective view, similar to FIG. 1, with additional components added.

Referring therefore to FIG. 9, the hoses 64 are entrained within a chain 111 made up of links connected in seriatim so as to be flexible in a radial plane but relatively rigid in an orthogonal plane. The chain 111 is secured to a mounting post 113 and depends from the post in an elongate loop to supply fluid to a manifold 115 associated with the tool 14. The post 113 may be resiliently mounted to reduce loads imposed by the chain 111.

A pair of flexible bumpers 116 are secured to the outer surface of the shroud in alignment with the chain 111. The bumpers 116 have a convex surface protruding outwardly from the surface of the shroud 16 and hold the chain 111 away from the shroud. The bumpers 116 may be made from flexible plastic or rubber-like compound with a degree of resilience.

Figure 10:
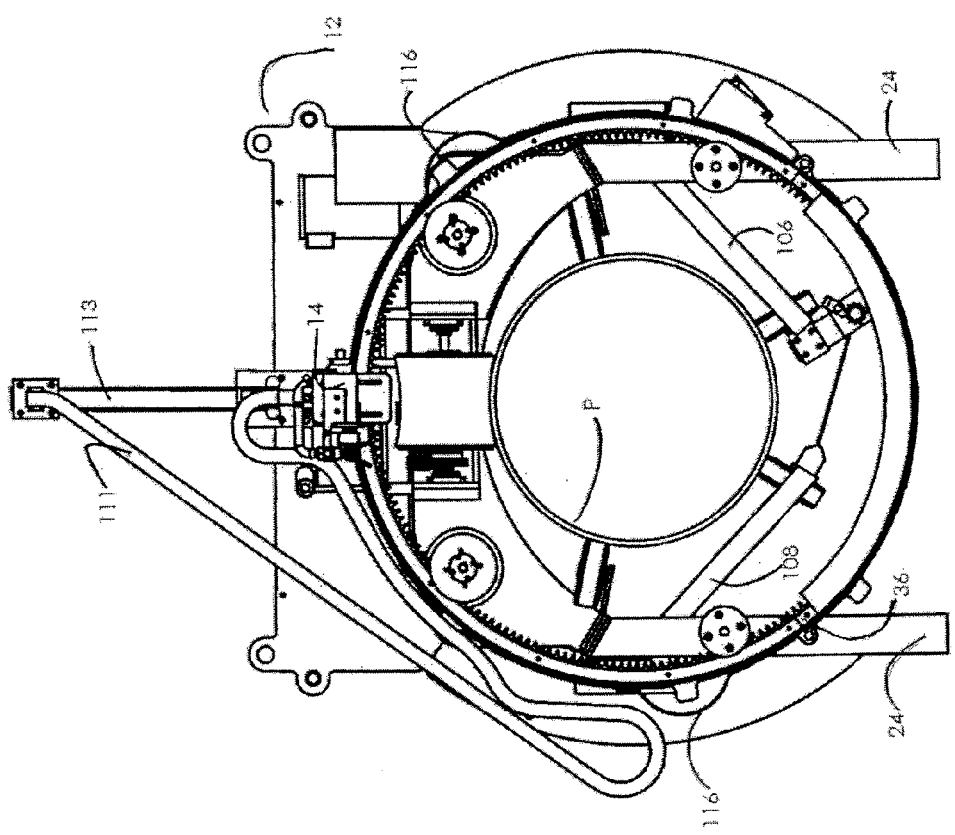
FIG. 10 is an end elevation of FIG. 9.

As can be seen in FIG. 10, the pair of the bumpers 116 is disposed on opposite sides of the mast 113 with the ring 36 in the midpoint of travel.

As the tool 14 rotates, the chain 11 is pulled over the bumper 116 but held away from the side of the shrouds. The bumpers 116 increase the effective diameter of the shroud and thus create a longer run for the chain 111. Upon reaching the limit of rotation, the chain 111 is wrapped around a portion of the shroud 16 and over the bumper 116. Reversal of the tool 14 allows the chain 111 to unwind and be held away from the side of the shroud until the opposite facing bumper moves past the mast 113 and again lifts the chain away from the surface of the shroud.

The movement of the chain 111 is thus controlled and its vertical limit reduced to avoid contact with the surrounding environment.

The control of the rotation of the ring 36 and the shroud 16 is performed by a single proximity switch cooperating with a reversible offset actuator. As can be seen from FIG. 11, a bracket 130 is secured to the band of the ring 36 and a pendulum 132 pivotally mounted to the band. A bolt 134 projects from the pendulum 132 and engages an edge of the bracket 130 to limit movement toward the ring 36.

Figure 12:
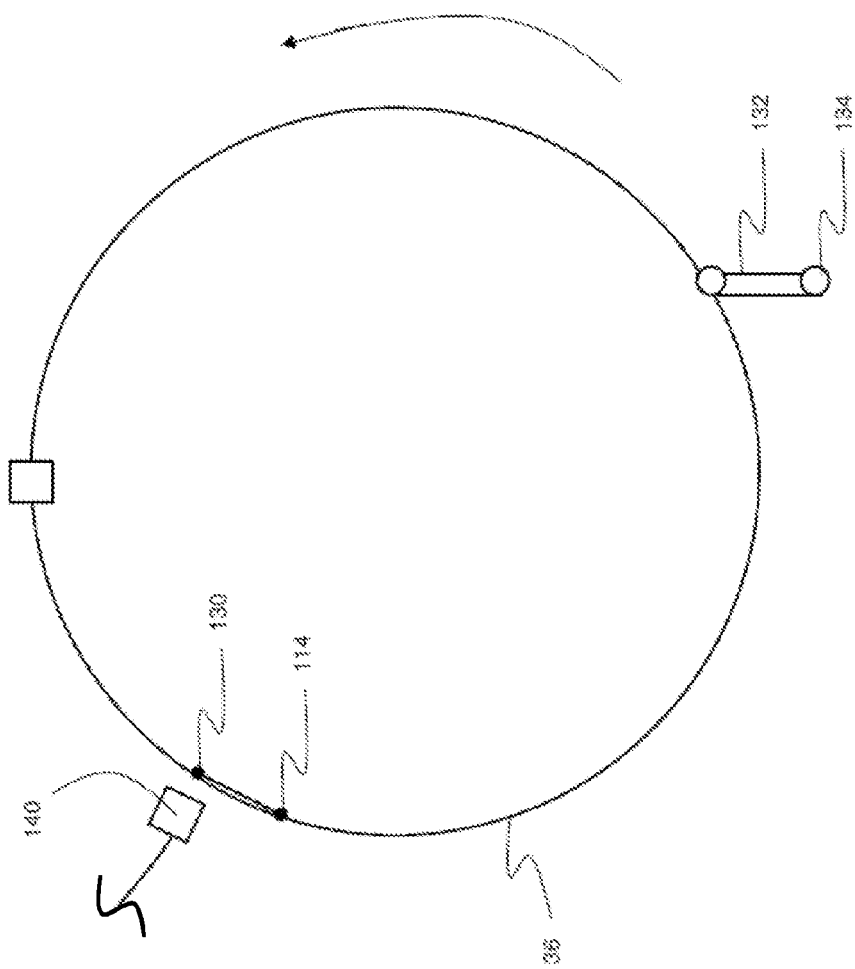
FIG. 12 is a schematic presentation of placement of control components shown in FIG. 11.

FIG. 12 shows schematically the arrangement of a proximity switch 140 which is connected to the control panel 104.

Figure 11:
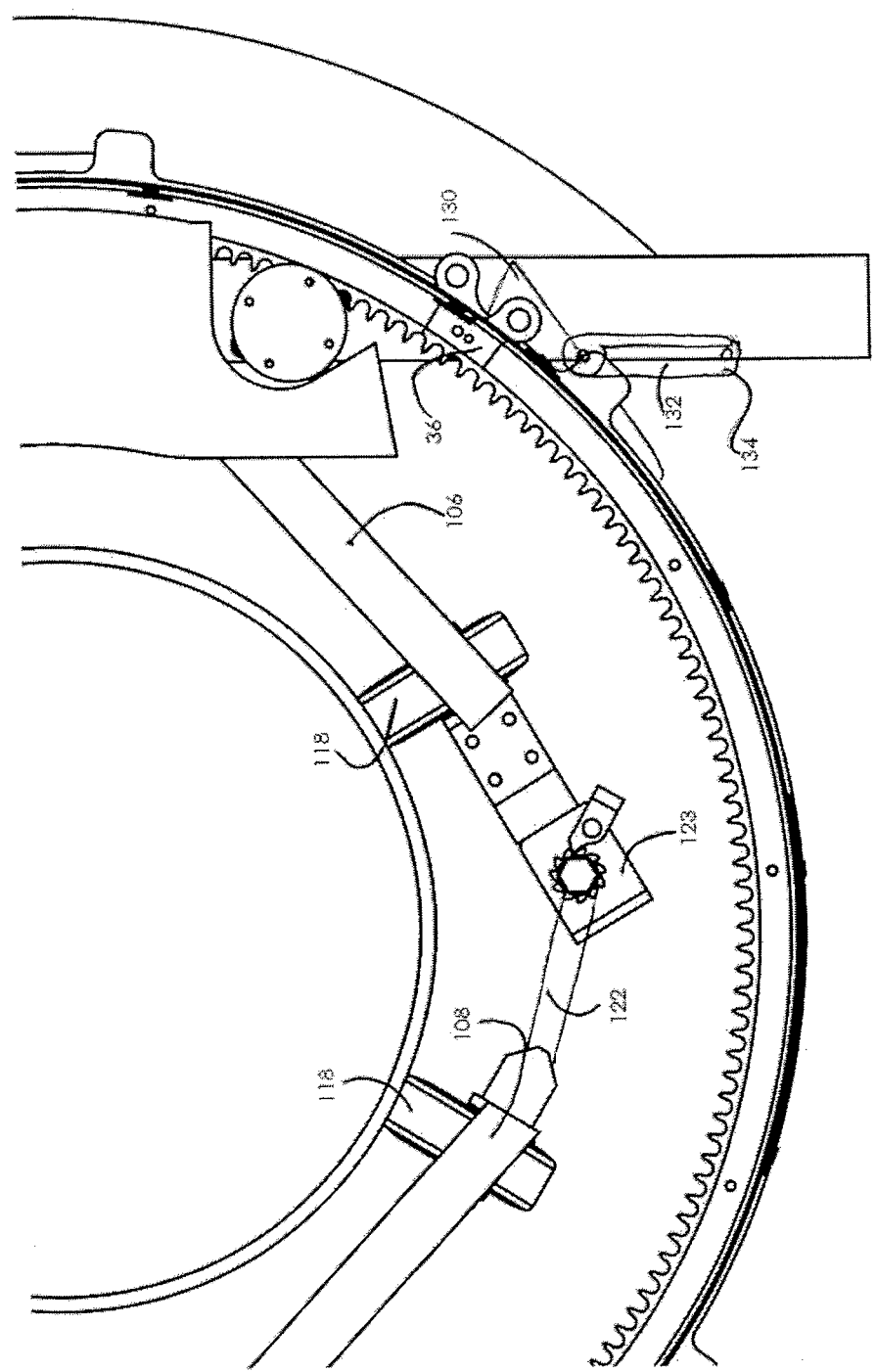
FIG. 11 is a detailed view of a part of the embodiment showing part of the control mechanism.

As the ring 36 rotates clockwise as viewed in FIGS. 11 and 12, the pendulum 132 hangs vertically. As the bracket 130 passes the lowest point of the ring 36, the pendulum 132 will pivot relative to the bracket 130 and continued rotation causes it to fall back against the bracket until the bolt 134 engages the bracket 130. The bolt 134 is trailing the pivot point of the pendulum 132 to the bracket 130 in the direction of rotation so that the pivot point moves past the proximity switch prior to actuation of the switch. It will be appreciated the pendulum 132 carries a magnet or insert of magnetic material to generate a signal and allow selective operation of the switch 140.

Actuation of the switch 140 causes reversal of the ring 36 so that the pendulum again will hang vertically as it passes through the lower path of the ring. Continued movement towards the upper portion of the ring causes the bolt 134 to engage the bracket so that it is once again trails the pivot in the direction of rotation as it moves past the proximity device 140. Reversal again occurs.

By providing for the pendulum to move between two stable positions, the area of the pipe swept by the tool slightly exceeds 360° and ensures a complete coverage of the pipe surface.

Figure 15:
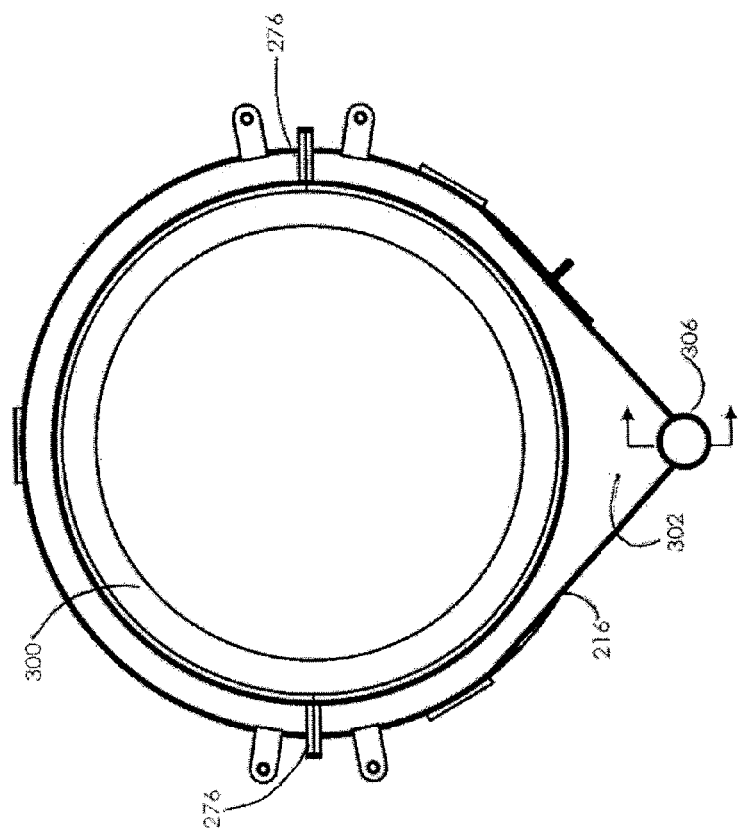
FIG. 15 is an end view of the machine of FIG. 14.
Figure 16:
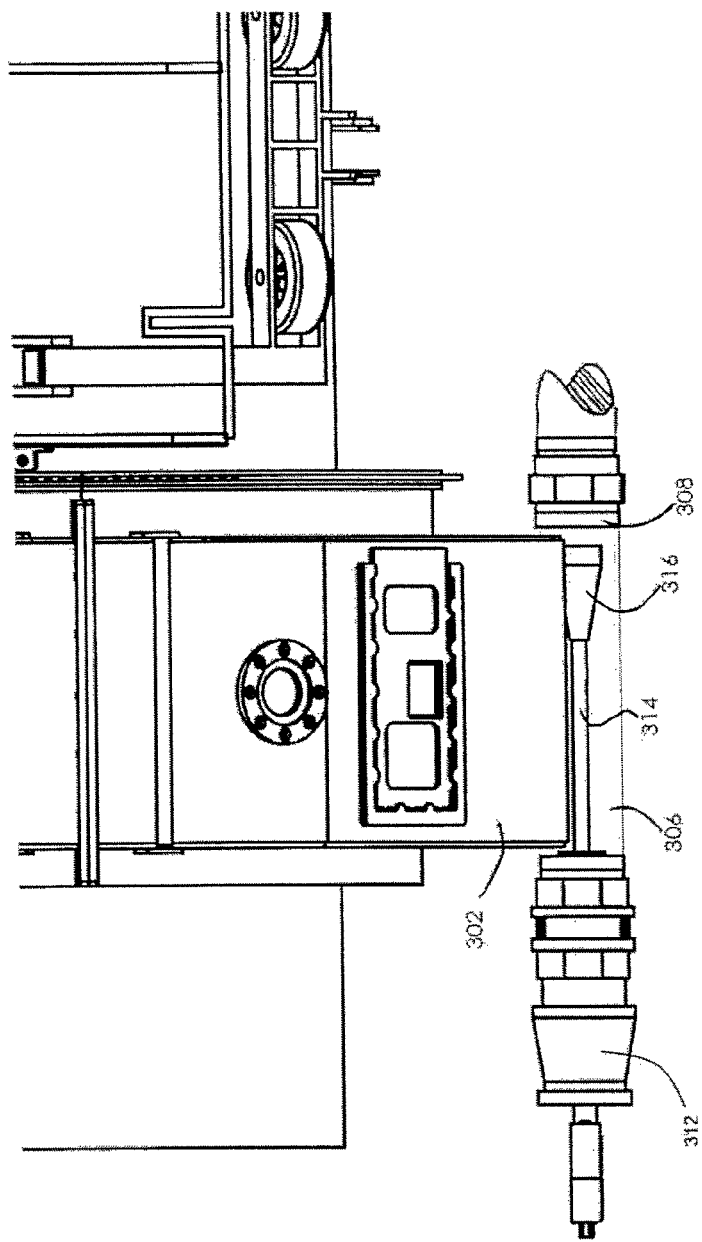
FIG. 16 is a section on the line A-A of FIG. 15.
Figure 17:
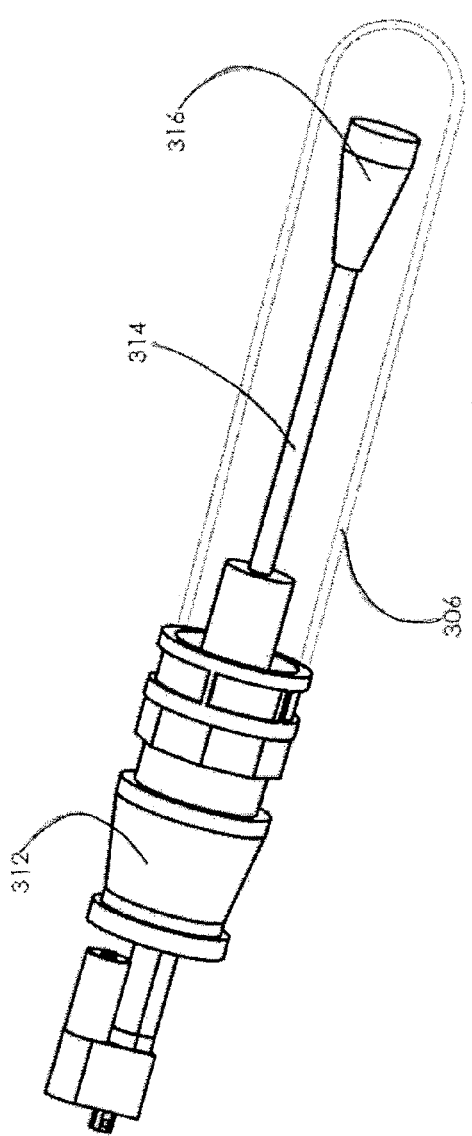
FIG. 17 is a perspective view of the components shown in FIG. 16.
Figure 18:
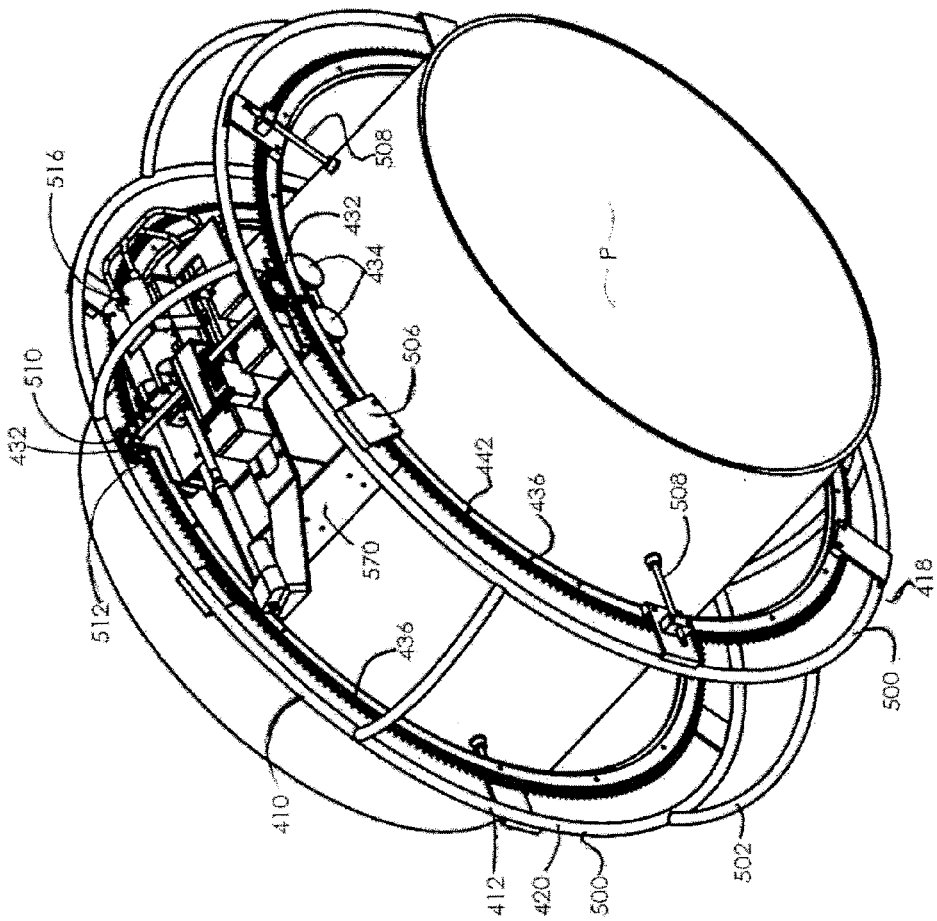
FIG. 18 is a perspective view of a still further embodiment.
Figure 19:
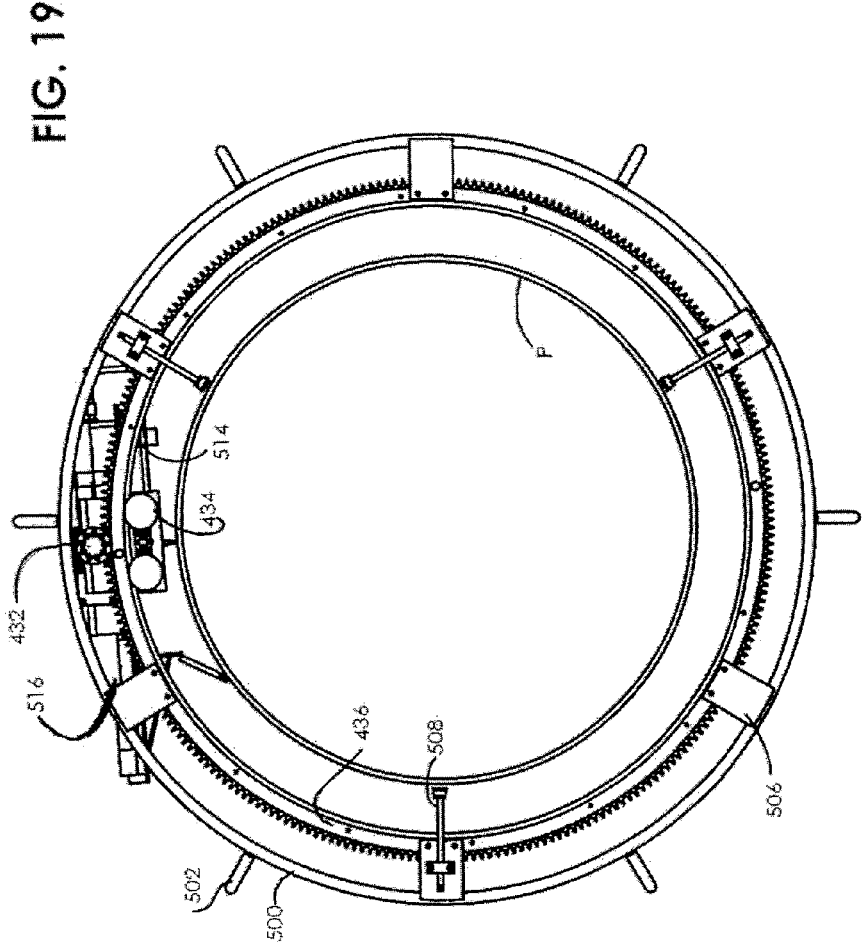
FIG. 19 is an end view of FIG. 18.
Figure 20:
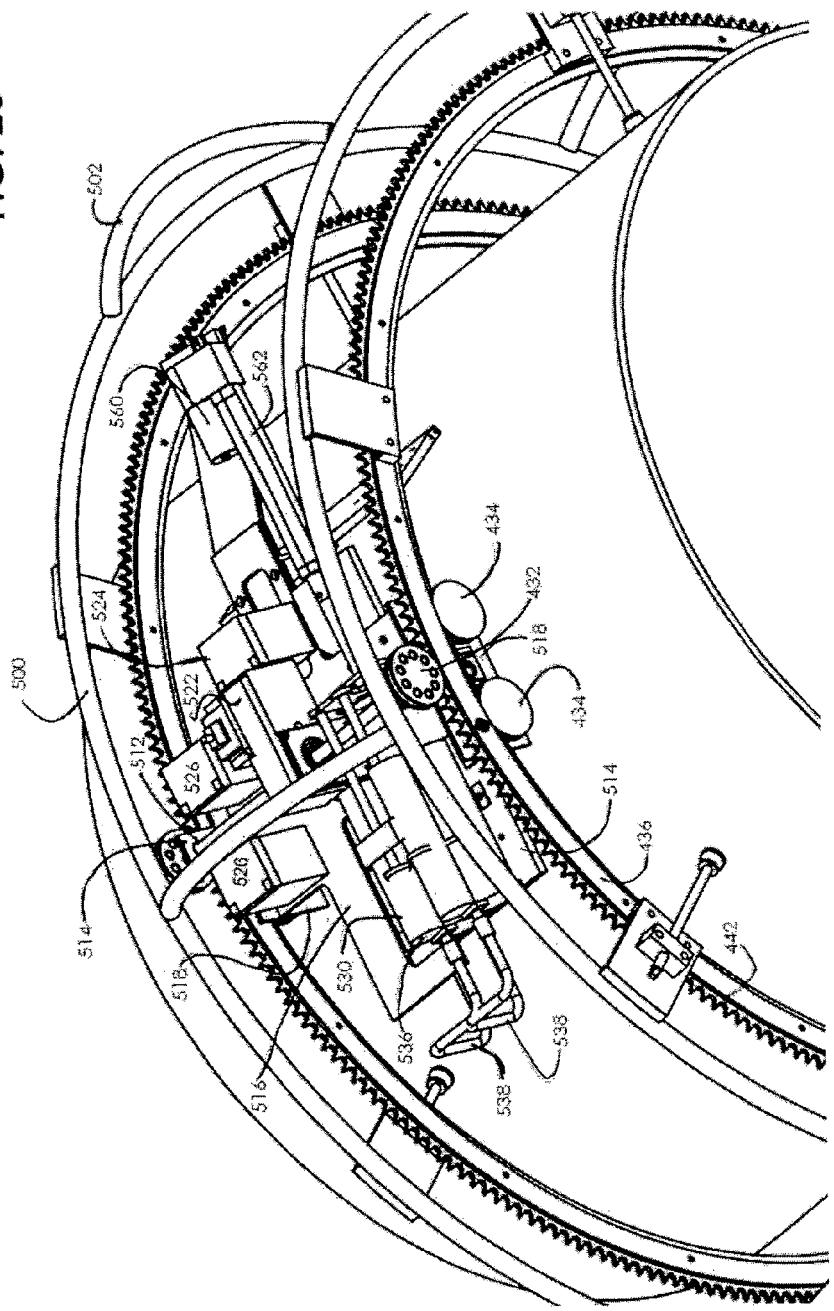
FIG. 20 is an enlarged perspective view of a portion of FIG. 18.

As noted above, the pipe conditioning tool may be used in a variety of applications including the removal of an existing coating from a pipe. An embodiment to perform such removal is shown in FIGS. 15-17 in which like reference numerals will be used to identify like components with a prefix 2 added for clarity.

Figure 14:
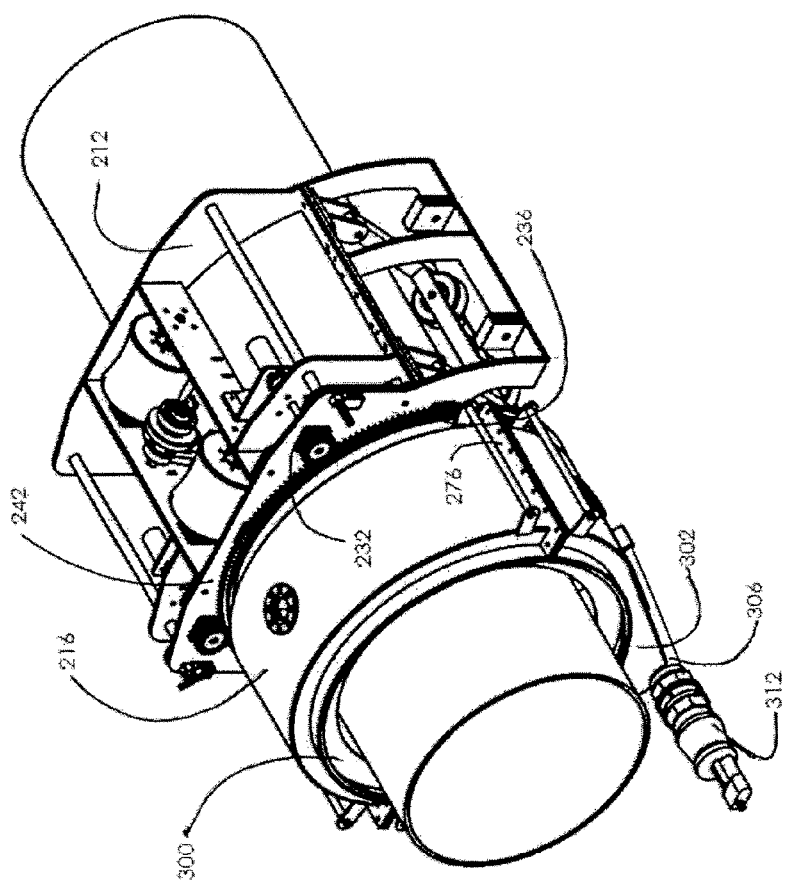
FIG. 14 is a perspective view of a further embodiment of pipe conditioning tool.

A support frame 212 similar to that described above with respect to FIGS. 1-12, carries a work head 214 surrounded by a shroud 216. The work head 214 may be rotated about the axis of the pipe P by a drive gear 232 cooperating with a ring gear 236. It will be noted in the arrangement shown in FIG. 14 that the ring 236 has radially outwardly directed teeth 242 to engage the drive gear 232 externally. It will of course be appreciated that the internally toothed gear may also be used in this arrangement.

The ring gear 236 carries a set of high pressure nozzles (not shown) distributed at 120 degree angles around the periphery of the ring gear 236 in a manner similar to that shown in FIG. 13. The nozzles are supplied with water through hoses (not shown) to produce a high pressure jet that impacts the surface of the pipe P. The ring gear 236 is oscillated over a 120 degree are to enable the jets to traverse the whole surface of the pipe P and remove the coating from the pipe.

The shroud 216 is split along its equator by flanges 276 to allow the shroud 16 to completely encompass the pipe. A brush seal 300 is arranged around the inner periphery of the shroud 16 to maintain contact with the pipe P and inhibit egress of contaminated water.

The shroud 216 is formed with a collection chamber 302 at its lower point to serve as a collection zone for material removed from the pipe. A tubular chamber 306 is formed at the apex of the collection chamber 302 and has an outlet port 308 for connection to a vacuum pipe. Debris removed from the pipe falls into the collection chamber 302 and into the tubular chamber 306 from where it is extracted by the vacuum pipe.

A pusher assembly 310 is provided in the tubular chamber 306 and comprises an actuator 312 driving a piston rod 314. The actuator 312 may be a hydraulic or air actuator or maybe a recirculating ball screw-type actuator that can extend or retract the piston rod 314 within the tubular member 306. A tapered piston 316 is carried by the piston rod 312 and is a clearance fit within the tubular chamber 306.

In operation, the tool 210 is positioned on the pipe P and secured in a manner described above. The shroud 216 is secured about the pipe at the leading edge of the tool 210 and the high pressure fluid supplied to the nozzles. At the same time, the work head 214 is caused to oscillate and the tool 210 is advanced along the pipe by the drive motors. The coating on the pipe P is removed by the action of the high pressure jets and is extracted through outlet port 308 by the vacuum pipe. The coating of the pipe P is typically fibrous in nature and may release in large chunks or strips. As such it may bridge the entrance to the outlet port 308 causing a gradual accumulation of the coating within the collection chamber 302. To avoid blockage or bridging of this nature, the actuator 312 is operated to extend the piston rod 314 and push material accumulated in the tubular chamber 306 along towards the outlet port 308. The action of the piston 316 within the tubular chamber 306 dislodges large portions that have bridged the tubular chamber and release them for movement into the exhaust duct. It has been found that the clearance of the piston from the sides of the tubular duct facilitate a clearing action of the debris causing it to move into the exhaust duct and avoid the build up of the debris.

In a typical application, the diameter of the tubular chamber is 4 inches and the diameter of the piston is 2.5 inches providing a clearance between the wall of the housing and the piston in the order of 0.75 inches. Obviously other dimensions may be utilized.

It will also be noted that the piston has a cortical rear face to facilitate the passage of the piston through the debris when being retracted and avoid the debris from being trapped behind the piston.

A further arrangement of pipe conditioning tool is shown in the embodiment of FIGS. 18-25 in which like components will be identified with like reference numerals with a prefix 4 added for clarity. The embodiment of FIGS. 18-25 is used to apply a coating to a girth weld formed between two sections of pipe. Typically, the coating applied during the manufacture of the pipe terminates prior to the end of the pipe to allow the adjacent ends of pipe sections to be welded to one another. Subsequent to the welding, the weld is covered to provide a uniform coating over the weld and adjacent areas.

The pipe conditioning tool 410 includes a support frame 412 with a pair of spaced apart yokes 418, 420. The yokes 418, 420 are formed as circular hoops 500 that completely circumscribe the pipe. The hoops 500 may be formed as a continuous member as they may be slipped on the free end of a pipe and moved along the pipe between welds or, more conveniently, may be formed as two part circular segments in the manner described above with respect to the upper and lower sectors of the drive ring 36 and as shown by the hinge 501 in FIG. 23.

The hoops 500 are maintained in space relationship by curved stringers 502 spaced apart around the circumference of the hoops 500. The stringers 502 provide convenient carrying points for the tool 410 as well as structural rigidity for the tool.

A pair of ring gears 436 are connected to respective ones of the hoops 500 through radial struts 506. Adjustable clamps 508 are mounted on alternate ones of the struts to maintain the tool centered on the axis of the pipe. The clamps 508 may be threaded bolts or other telescopic supports that may be engaged with the pipe and retracted when the tool 410 is to be moved.

Each of the ring gears 436 has teeth 442 directed radially outwardly and engaged a drive by gear 432. A shaft 510 extends between the drive gears 432 and is rotatably supported in bearings 512. The bearings 512 are connected to a platform 514 that provides a body of a carriage 516. A web 518 projects radially inwardly from the platform 514 and carries a pair of guide rollers 434 that engage the radially inner face of the ring gear 436. The guide rollers 434 maintain that the drive gear 432 in contact with the teeth 442 and provide a stable location for the carriage relative to the ring gear 436.

The shaft 510 passes through a gear box 522 mounted on the platform and transmitting drive from a motor 524 to the shaft 510. Power for the motor 524 is provided by rechargeable battery packs 526.

Figure 21:
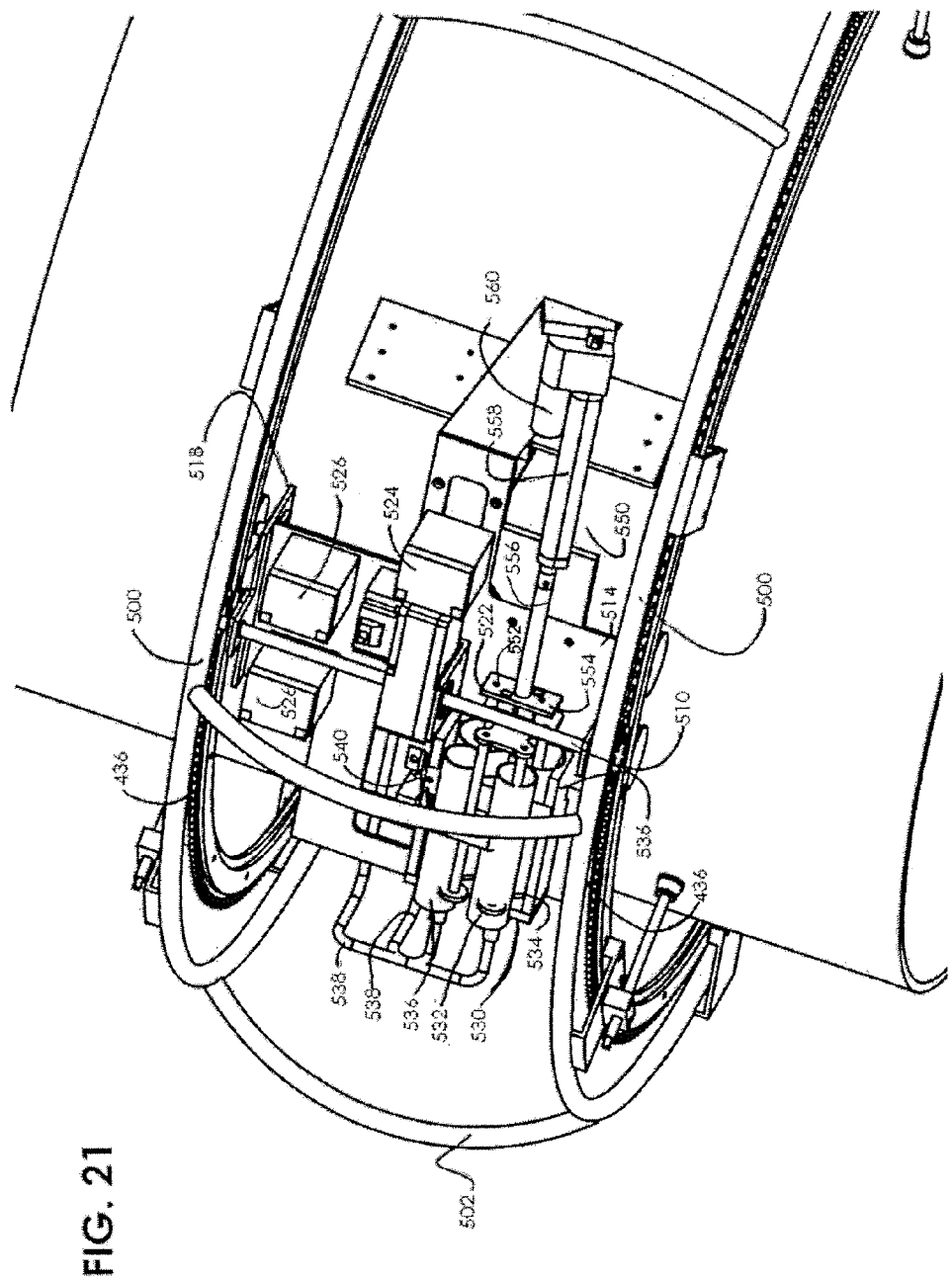
FIG. 21 is a plan perspective view of FIG. 20.
Figure 22:
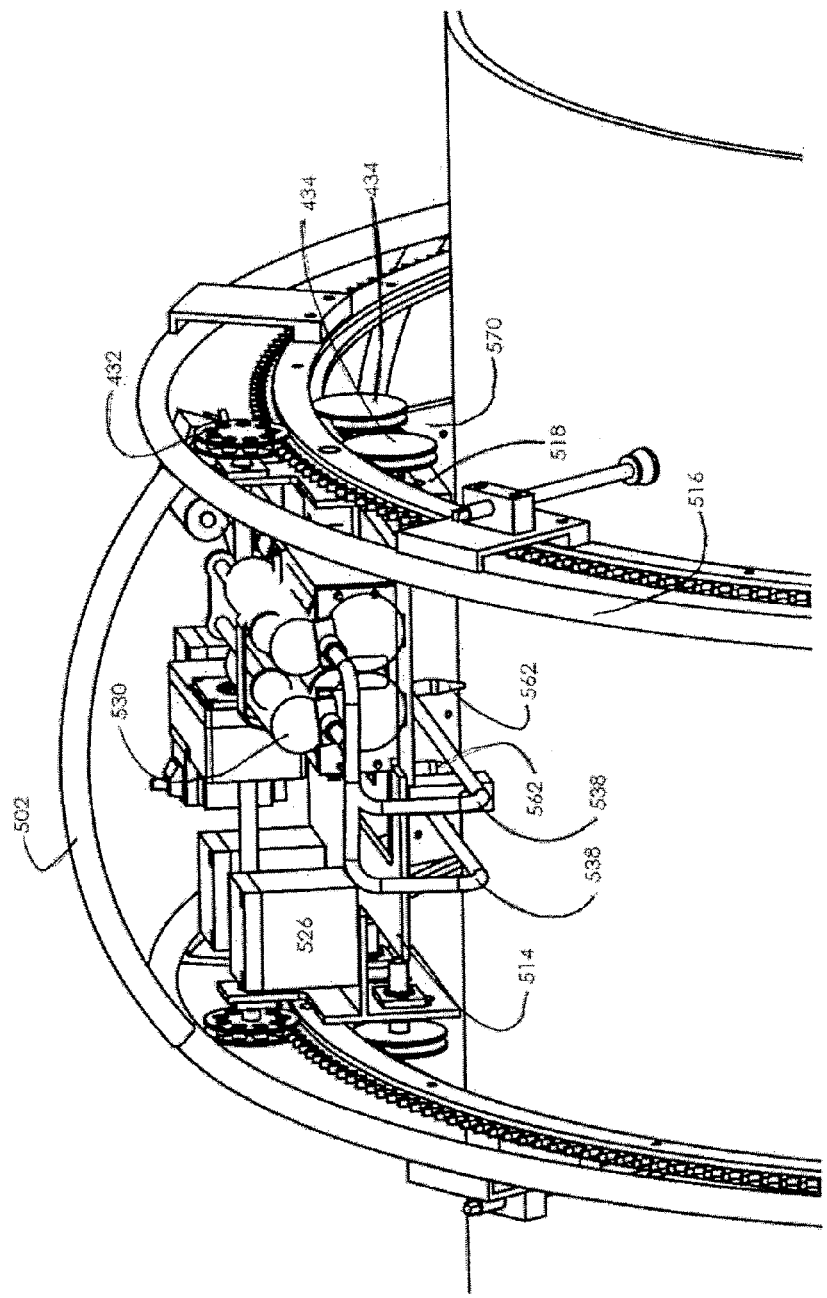
FIG. 22 is a side perspective view of the embodiment of FIG. 18.
Figure 23:
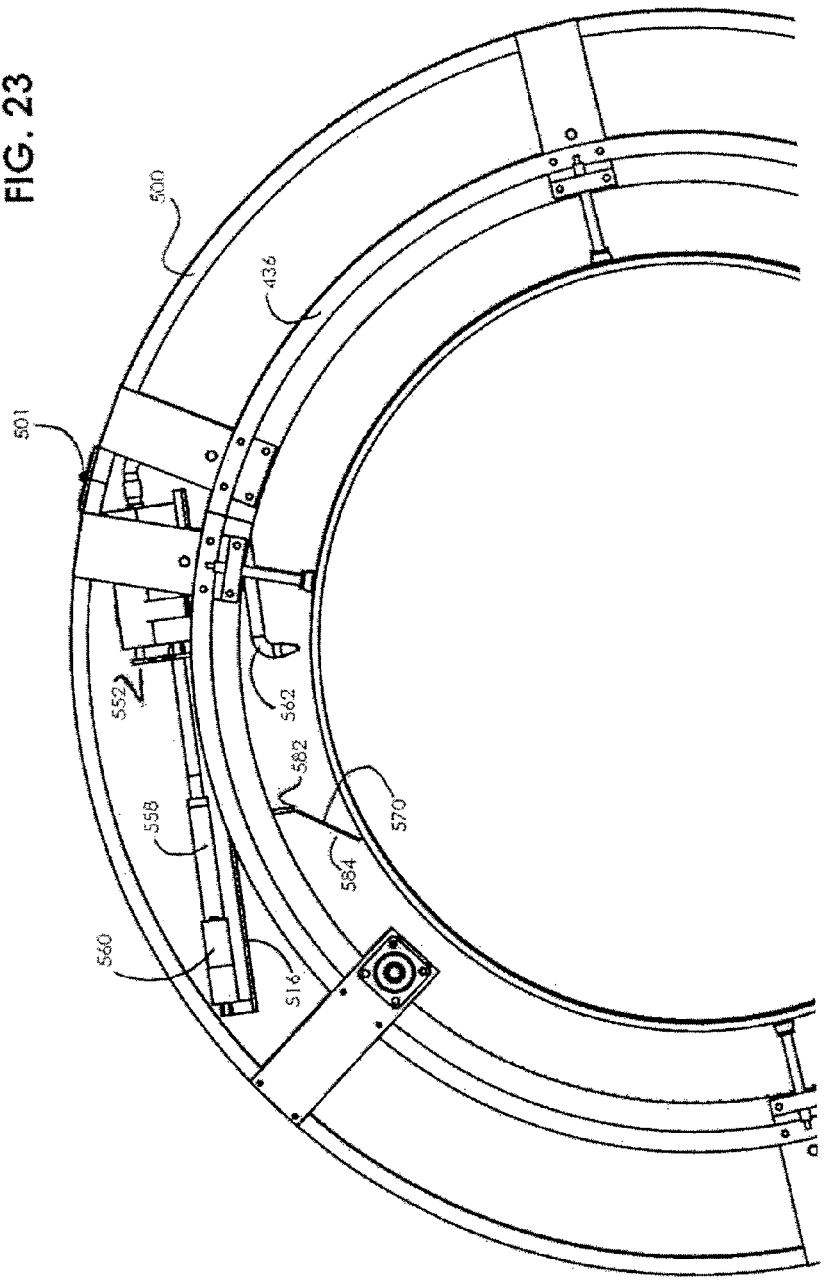
FIG. 23 is an enlarged end view of a portion of FIG. 19.
Figure 24:
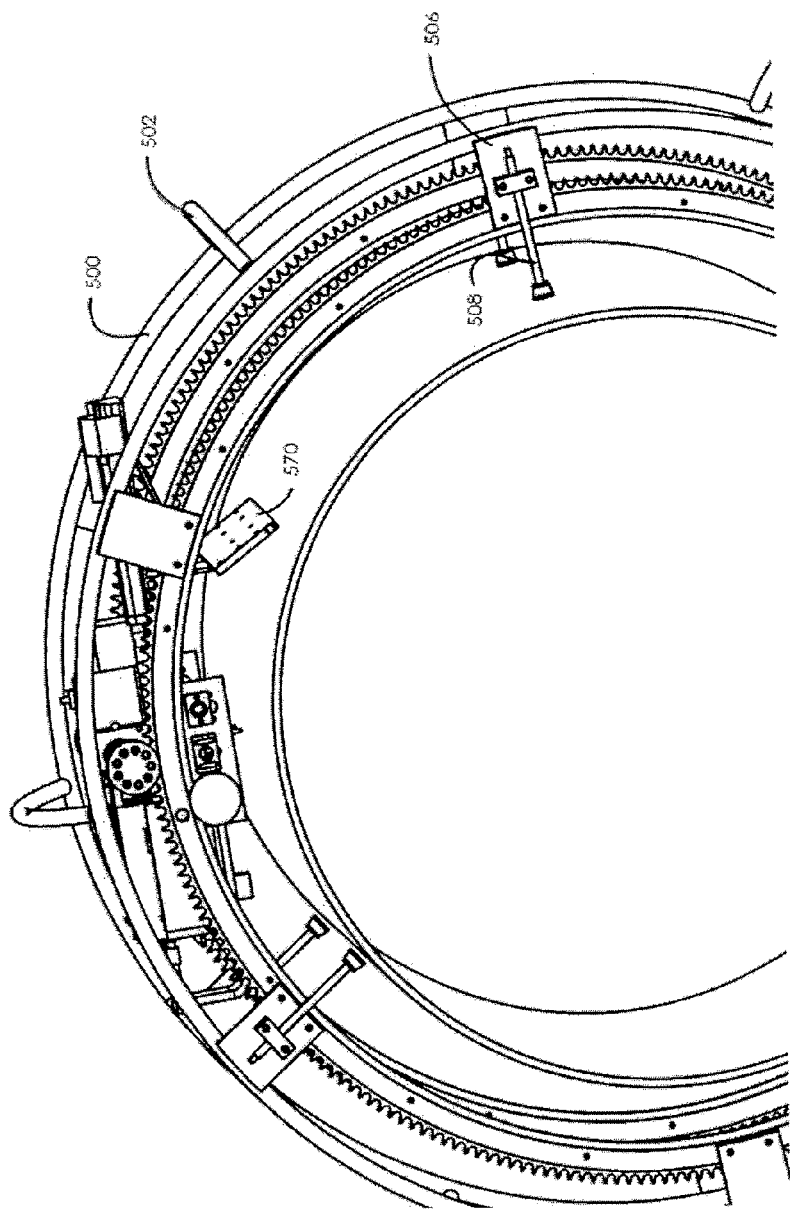
FIG. 24 is a view similar to FIG. 23 of a further portion of the machine of FIG. 19.
Figure 25:
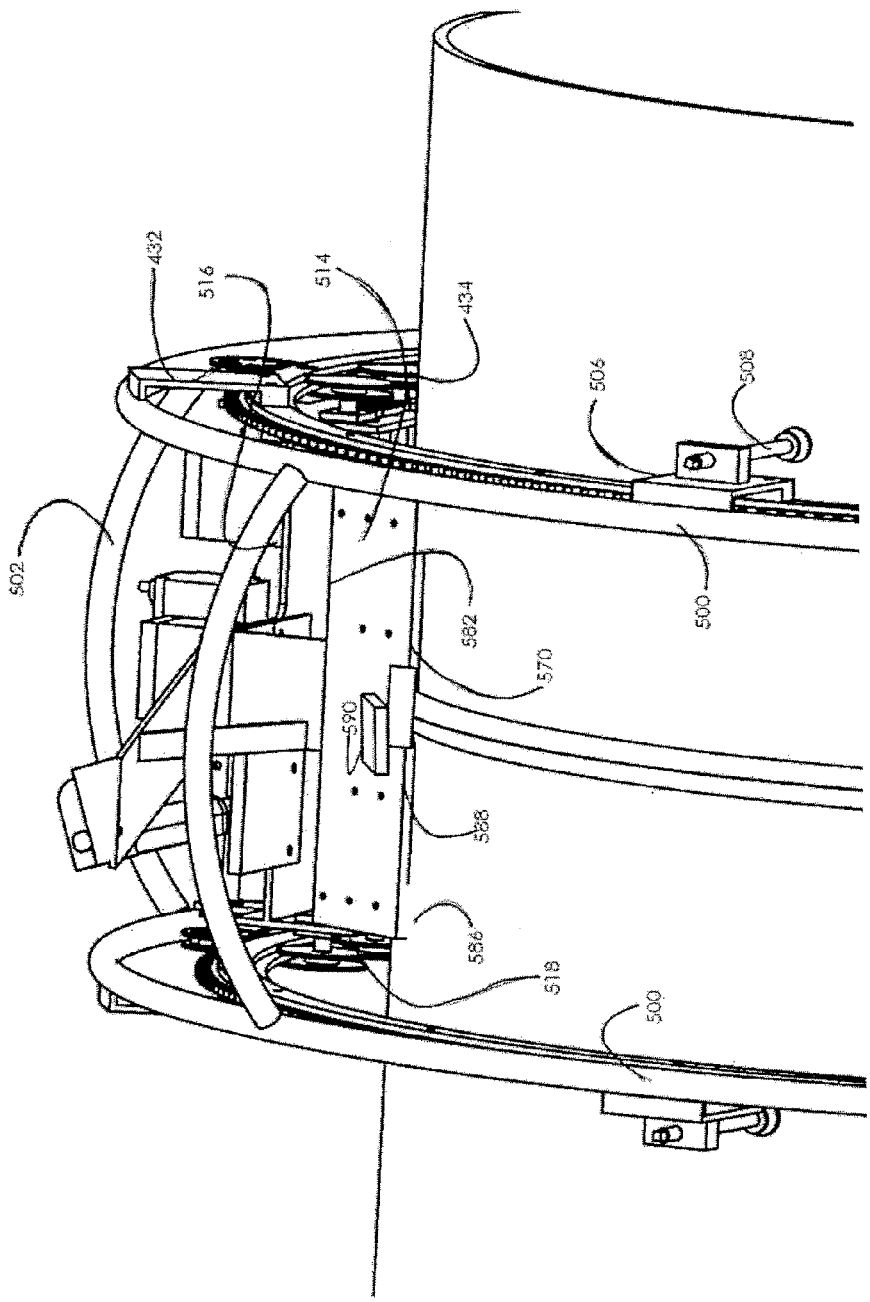
FIG. 25 is a side view of the portion shown in FIG. 24.

A coating dispenser assembly 530 is mounted on the platform 514 adjacent to the gear box 522. The dispenser assembly 530 is designed to dispense two components of a two pack epoxy coating from respective cartridges 532, 534. The cartridges 532, 534 are received in respective bores of a housing 535 that contains a mixing head 536. The output of the mixing head 536 is connected to a dispensing tube 538. As shown in FIGS. 21 and 22, two pairs of cartridges are mounted on the platform and secured by a strap 540. Each of the cartridges is a disposable cartridge with a self contained piston that can be connect to the mixing head through a nozzle. The diameter of the cartridges corresponds to the ratio of the components to be mixed to form the coating as is conventional in the art.

To expel the coating material from the cartridges, a pusher assembly 550 is provided. The pusher assembly 550 includes a cross head 552 from which piston rods 554 extend into each of the cartridges. The crosshead 552 is connected to an actuating rod 556 of an actuator 558. The actuator 558 can be a linear actuator of convenient form but typically a screw and ball actuator driven by a motor 560. The motor is reversible to extend or retract the actuating rod 556 and thereby move the piston rods into and out of the cartridges.

The dispensing tubes 538 terminate, in nozzles 562 positioned on the center line of the tool 410 and abutting the pipe surface, A filter is incorporated into the tube to facilitate mixing and, in a typical application, a 0.023 inch spray orifice has been found to improve the mixing of the components. The tubes 538 are oriented so as to bear against the surface of the pipe to deliver the material directly onto the surface of the pipe. Alternatively an applicator head such as a elongate tube with slots or a spreader blade may also be used to ensure initial contact of the coating material with the pipe surface.

A trowel 570 is supported on a trailing edge of the carriage and is spring loaded into engagement with the surface of the pipe. The trowel 570 is connected to the carriage through a hinge 582 which incorporates a torsion spring to bias a blade 584 into contact with the coating. Trailing edge 586 of the trowel includes a rectilinear notch 588 that has a width generally conforming to the exposed portion of the pipe over the weld. A vibrator 590 is mounted on the trowel to assist in distributing the coating material.

In use, the tool 410 is slid along the pipe and positioned over the girth weld. The clamps 508 are adjusted to make the pipe and hoops 500 concentric. Cartridges 532, 534 are attached to the carriage 516 with the rod 556 fully retracted. The motor 524 is operated to rotate the shaft 510 and the drive gear 432 and cause the carriage 516 to move along the ring gear 436 and around the pipe. As the carriage 516 is moved, the motor 560 on the actuator 558 is operated and progressively displaces the contents of the cartridge at a predetermined rate through the dispensing tubes 538. The contents are deposited onto the pipe as the carriage 516 moves around the pipe and the trowel 570 spreads the coating material in the gap between the coating on the pipe. The carriage 516 continues to rotate as the contents of the cartridge are dispensed and, upon complete dispensing of the contents may continue to rotate as the material is progressively spread and distributed by the trowel 570. Once the desired finish has been attained, the motor 524 is stopped and the tool 410 may be moved to the next girth weld. The rod 556 is retracted and the new cartridges placed on the carriage 516 to supply the mixture to the next weld. This process can be repeated along the length of the pipeline until the girth welds are treated.

As described above, the girth welds are coated in during the assembly of a pipeline from individual sections, but it will also be apparent that with a segmented ring gear 436, selective recoating of a girth weld may be performed on a reconditioned pipeline.

Similarly, although electric controls and power is described, it will be appreciated that similar effects may be attained with hydraulic power units.

The invention claimed is:

1. A pipe conditioning tool comprising a drive unit to move said tool along a pipe and a work head configured to rotate by said drive unit about an axis of said pipe to condition a surface of said pipe, said drive unit including a frame including a pair of yokes, each having a bight extending across said pipe and a pair of legs extending from said bight at a spacing to accommodate said pipe, said legs extending to opposite sides of said pipe, a pair of arms pivotally connected to said frame on opposite sides of said pipe and moveable about a longitudinal axis to said pipe to engage said pipe to secure said frame to said pipe, said arms each having wheels connected thereto to engage said pipe and to support said frame for movement along said pipe, said arms being configured to move from an open position aligned with said legs to permit said pipe to pass between said arms to a secure position in which said arms extend toward one another from said legs to encompass said pipe, said legs extending radially beyond said work head and said arms to provide support for said tool upon removal from said pipe, said drive unit further including a ring gear having radially inwardly directed gear teeth and a plurality of guide rollers spaced apart about said ring gear and engaging said gear teeth, a drive gear engaging said ring gear and rotatable by a drive motor to impart rotation to said ring gear, said work head being connected to said ring gear for movement therewith.

2. A pipe conditioning tool according to claim 1 wherein said arms are pivotally connected to said frame adjacent said bight.

3. A pipe conditioning tool according to claim 1 wherein a flexible releasable fastener extends between said arms to hold said wheels in engagement with said pipe.

4. A pipe conditioning tool according to claim 1 wherein a drive roller is mounted on said frame for engagement with said pipe.

5. A pipe conditioning tool according to claim 4 wherein a pair of drive rollers are provided at spaced locations on said frame.

6. The pipe conditioning tool according to claim 1 wherein a plurality of work heads are circumferentially spaced about said ring gear.

7. The pipe conditioning tool according to claim 1 wherein each of said guide rollers includes a hub and a pair of flanges on opposite sides of said hub, said ring gear being received between said flanges.

8. The pipe conditioning tool according to claim 1 wherein a pair of guide wheels engage a lateral face of said ring gear at circumferentially spaced locations to support said ring gear during rotation.

9. A pipe conditioning tool according to claim 1, wherein said drive motor is reversible to impart rotation in opposite directions about said pipe and cause said working head to oscillate about said pipe.

10. A pipe conditioning tool according to claim 1 wherein reversal of said drive motor is controlled by a limit switch operable to ascertain angular disposition of said ring gear.

11. A pipe conditioning tool according to claim 10 wherein said limit switch includes a signal generating member carried by said ring gear and circumferentially displaceable on said ring gear between a pair of positions.

12. A pipe conditioning tool according to claim 1, a said work head is located in a shroud, said shroud being configured to rotate with said ring gear about an axis of said pipe, said shroud including a collection zone to receive material removed from said pipe, an outlet to remove material from said collection zone, and a rod moveable through said collection zone toward and away from said outlet.

13. A pipe conditioning tool according to claim 12, wherein said collection zone includes a tubular member connected to said outlet and said rod moves along said tubular member.

14. A pipe conditioning tool according to claim 13 wherein said rod is a clearance fit in said tubular member.

15. A pipe conditioning tool according to claim 14 wherein said rod includes an enlarged head.

16. A pipe conditioning tool according to claim 12 wherein said rod is moved by a linear actuator through said collection zone.

17. A pipe conditioning tool according to claim 1 including a reversible drive to rotate said work head relative to said drive unit about said pipe, the direction of rotation of said work unit being controlled by a limit switch responsive to the angular disposition of said work head to said drive unit, said limit switch including a signal generating member configured to rotate with said work head and circumferentially displaceable relative thereto between a pair of positions.

18. A pipe conditioning tool according to claim 17 wherein said signal generating member is a bar pivotally connected said ring gear and rotatable about said pivot between said pair of positions.

19. A pipe conditioning tool according to claim 18 wherein said bar carries a signal generator at a location remote from said pivot and said signal generator trails said pivot in the direction of rotation.

* * * * *